US011765247B2

(12) United States Patent
Lane et al.

(10) Patent No.: US 11,765,247 B2
(45) Date of Patent: Sep. 19, 2023

(54) METHODS AND APPARATUS FOR CONTROLLING THE PRESENTATION OF DATA THROUGH AN OPERATOR INTERFACE BY MONITORING USER INTERACTIONS ACROSS VARIOUS COMPUTE DEVICES

(71) Applicant: Olive AI, Inc., Columbus, OH (US)

(72) Inventors: Sean Lane, Worthington, OH (US); Edward Canales, Dublin, OH (US); William "Billy" Murray, Columbus, OH (US)

(73) Assignee: Olive AI, Inc., Columbus, OH (US)

( * ) Notice: Subject to any disclaimer, the term of this patent is extended or adjusted under 35 U.S.C. 154(b) by 0 days.

(21) Appl. No.: 17/499,343

(22) Filed: Oct. 12, 2021

(65) Prior Publication Data

US 2022/0116467 A1 Apr. 14, 2022

Related U.S. Application Data

(60) Provisional application No. 63/089,637, filed on Oct. 9, 2020.

(51) Int. Cl.
*G06F 11/34* (2006.01)
*H04L 67/50* (2022.01)
*H04L 67/55* (2022.01)

(52) U.S. Cl.
CPC ........ *H04L 67/535* (2022.05); *G06F 11/3438* (2013.01); *H04L 67/55* (2022.05)

(58) Field of Classification Search
None
See application file for complete search history.

(56) References Cited

U.S. PATENT DOCUMENTS

| 9,854,972 | B2* | 1/2018 | Mensinger | A61B 5/145 |
| 10,671,378 | B2* | 6/2020 | Jaladi | G06F 8/658 |
| 10,855,625 | B1* | 12/2020 | Viswanathan | H04L 51/02 |
| 2014/0258872 | A1 | 9/2014 | Spracklen et al. | |
| 2016/0360382 | A1* | 12/2016 | Gross | G06F 9/453 |
| 2017/0220240 | A1* | 8/2017 | Kataria | G06F 3/0488 |
| 2019/0087832 | A1* | 3/2019 | Mercury | H04L 63/0861 |
| 2020/0402058 | A1* | 12/2020 | Zhou | G06F 9/542 |
| 2021/0241925 | A1* | 8/2021 | Cho | H04L 67/535 |

OTHER PUBLICATIONS

International Search Report and Written Opinion for International Application No. PCT/US2021/054629 dated Jan. 31, 2022, 9 pages.

* cited by examiner

*Primary Examiner* — James A Edwards
(74) *Attorney, Agent, or Firm* — COOLEY LLP (57) ABSTRACT

A compute device can monitor interactions with a user and/or remote entity. A real-time stream of event information can be generated by the compute device based on the interactions. At least one software application operating in the compute device can analyze the real-time stream of event information to identify a predefined trigger. In response to identifying the predefined trigger, a pre-defined message can be output.

19 Claims, 3 Drawing Sheets

METHODS AND APPARATUS FOR CONTROLLING THE PRESENTATION OF DATA THROUGH AN OPERATOR INTERFACE BY MONITORING USER INTERACTIONS ACROSS VARIOUS COMPUTE DEVICES

CROSS-REFERENCE TO RELATED PATENT APPLICATION

This application claims priority to and benefit of U.S. Provisional Application No. 63/089,637, filed Oct. 9, 2020 and titled "Methods and Apparatus for Providing a Recommendation that Consolidates Multiple Alerts to a User", the contents of which are incorporated by reference herein.

FIELD

One or more embodiments relate to monitoring and analyzing interactions that a user compute device has, both locally and with outside compute devices, to control the presentation of information to the user through an operator interface (e.g., a user interface). The information presented to the user can include, for example, visually displayed information or audible information.

BACKGROUND

Many computer systems provide user interfaces through which users can receive alerts for various situations that may spur users to take remedial actions. For example, in the health care context, a user of a computer system may receive private patient information, billing information, payment information, etc. based on which a user can take actions. Such a user may also receive alerts about missing information, inaccurate information, contradicting information, etc. When a user, however, receives too many such alerts, the user can ignore these alerts and the alerts can be ineffective.

Thus, a need exists for providing a system for aggregating or highlighting alerts and/or related information that involve a higher-level of attention or response by the user.

SUMMARY

In one or more embodiments, a method includes monitoring interactions of a compute device with a user and at least one remote entity. A real-time stream of event information is generated based on at least a portion of the interactions. A first software application operating in the compute device analyzes the real-time stream of event information to identify a first predefined trigger in the real-time stream of event information. A second software application operating in the compute device and different than the first software application analyzes the real-time stream of event information to identify a second predefined trigger in the real-time stream of event information and different from the first predefined trigger. In response to the first predefined trigger, a first message event associated with the first predefined trigger is generated. In response to the second predefined trigger, a second message associated with the second predefined trigger different than the first message is generated. The first message is output, and the second message is output.

In one or more embodiments, a non-transitory processor-readable medium stores code representing instructions to be executed by a processor, the instructions comprising code to cause the processor to generate, by a compute device, a real-time stream of event information based on interactions being monitored at the compute device. A first software application operating in the compute device analyzes the real-time stream of event information to identify a first predefined trigger in the real-time stream of event information. A second software application operating in the compute device and different than the first software application analyzes the real-time stream of event information to identify a second predefined trigger in the real-time stream of event information and different from the first predefined trigger. In response to the first predefined trigger, a first message associated with the first predefined trigger is generated. In response to the second predefined trigger, a second message associated with the second predefined trigger different than the first message is generated. The first message is output, and the second message is output.

In one or more embodiments, an apparatus comprises memory storing at least one software application. The apparatus also comprises a processor operatively coupled to the memory and configured to monitor interactions with at least one of a user or a remote entity. A real-time stream of event information is generated based on at least a portion of the interactions. The at least one software application analyzes the real-time stream of event information to identify a predefined trigger in the real-time stream of event information. In response to the predefined trigger, a message associated with the predefined trigger is generated. The message is caused to be output.

DETAILED DESCRIPTION

The methods and apparatuses discussed herein relate to a compute device that can, for example, consolidate, aggregate, and expose event-based data about a user's interactions with their compute device (e.g., operating system, software applications). In some embodiments, a program (e.g., desktop application) operating in the compute device can collect and expose event-based data through communication endpoints (e.g., a communication network node or interface exposed by a communication channel). Software applications that are part of the program can stream, persist, transmit, and process information generated by the communication endpoints. The software applications can surface (e.g., display visual or output audio messages) real-time insights, referred to herein as whispers, to a user through the program. In some implementations, capabilities of the program can be extended and customized by adding additional software applications through a software application store.

The program with the communication endpoints can locally detect in real-time a user's direct interactions with their compute device (e.g., operating system, file system). For example, the communication endpoint associated with the keyboard can stream keystrokes that a user types, the communication endpoint associated with the clipboard can analyze the contents of the compute device's clipboard, and the communication endpoint associated with the cursor can identify what a user's cursor has clicked on and/or where the user's cursor is at any given moment. This information is exposed through the communication endpoints and is consumed and processed by unique software applications.

The software applications built to run on the compute device consume and process information generated by the communication endpoints. The software applications allow the capabilities of the program/compute device to be extended, similar to how an app can extend the capabilities on a smartphone. Each software application can be built, for example, to solve a specific problem or workflow. For example, one software application could consolidate data from multiple files and improve the search performance on that data. The software applications can be built, for example, using specific software development kits (SDK) that allows a software application to communicate and interact with the platform. The SDK enables the software applications to generate whispers, or intelligent notifications, that surface (e.g., display visual or output audio messages) insights to users via the program. Users can add, pause, or remove the software applications to remove excess whisper generation through the software application store and/or add new types of whispers.

A software application store can contain software applications that can be integrated into the program. Users can browse, search, and add additional software applications to their instance of the program through the software application store. In some implementations, developers can submit their software applications through the software application for the software applications to be discoverable by the user community. In some implementations, an approval process can occur, where an administrator and/or software application store reviews each software application for compliance and adherence to the program's software application standards. Third parties can develop these software applications using the SDK to watch a real-time stream of events locally on a user's device (i.e., the user that downloaded the application(s) from the platform app store to their compute device). These software applications can leverage local and/or remote data sources (e.g., by monitoring data from such data sources) to obtain more context about when and how to react to events.

An advantage provided by the apparatuses and methods discussed herein is the outputting of intelligent messages. Rather than overloading a user with information, the program can monitor local and remote interactions at a user compute device using a variety of sensors, and various software applications can choose if and how to react to specific events. Reactions can come in the form of messages, which can alter how a user interacts with their compute device to define a newly optimized user workflow. Furthermore, the ability to add/edit software applications (e.g., via an SDK) enable flexibility because what may be worth outputting in one scenario may not be worth outputting in a different scenario. Lastly, rather than processing the stream of events asynchronously and/or using multiple devices, the software applications process the stream of events locally, which allows for security of event data and real-time reaction to events. Since the software application(s) and program are both operating in a single compute device and the stream of events are processed synchronously, (1) risks introduced by sharing data to different devices are mitigated, and (2) message can be delivered to users in a more timely manner.

Figure 1:
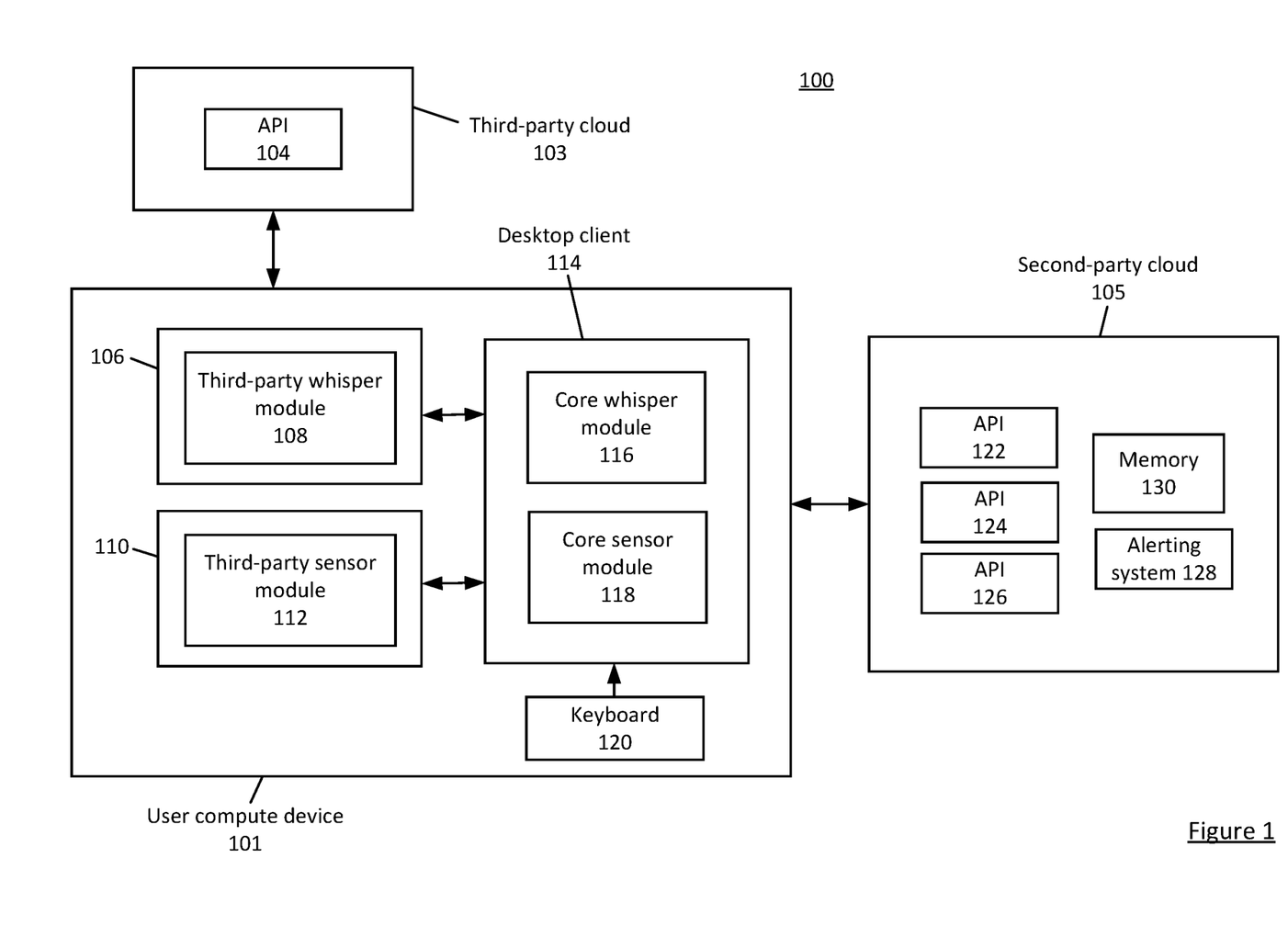
FIG. 1 shows a block diagram of a system for analyzing user interactions to improve workflow, according to an embodiment.

FIG. 1 shows an architecture overview of the computer system 100, according to an embodiment. As shown, the system 100 includes a user compute device 101, which is coupled to a third-party cloud 103 (having compute devices) and a second-party cloud 105 (having compute devices).

Although not shown, the user computer device, 101 the third-party cloud 103 and the second-party cloud 105 can be interconnected by a network. The network can be, for example, a wireless network(s) or a combination of a wireless network(s) and wired networks. As such, the connection between each of the user compute device, the third-party cloud, the second-party cloud and the network can be a wireless connection(s) and/or wired connection(s). More specifically, the wired or wireless communication networks of network can include one or more communication channels, for example, a radio frequency (RF) communication channel(s), an extremely low frequency (ELF) communication channel(s), an ultra-low frequency (ULF) communication channel(s), a low frequency (LF) communication channel(s), a medium frequency (MF) communication channel(s), an ultra-high frequency (UHF) communication channel(s), an extremely high frequency (EHF) communication channel(s), a fiber optic commination channel(s), an electronic communication channel(s), a satellite communication channel(s), and/or the like. The network can be, for example, the Internet, an intranet, a local area network (LAN), a wide area network (WAN), a metropolitan area network (MAN), a worldwide interoperability for microwave access network (WiMAX®), a virtual network, any other suitable communication system and/or a combination of such networks.

The user compute device 101 can be, for example, any type of computer, server, etc. that has a processor that executes instructions such as software instructions stored in a memory that is operatively coupled to the processor. The processor can be, for example, a hardware based integrated circuit (IC) or any other suitable processing device configured to run or execute a set of instructions or a set of codes. For example, the processor can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), and/or the like. The processor is operatively coupled to the memory through a system bus (for example, address bus, data bus, and/or control bus).

The third-party cloud 103 and the second-party cloud 105 each can be a collection of interconnected compute devices that provide on-demand availability of computer resources such as data storage and computer power, without direct active management by a user. Each of the third-party cloud 103 and the second-party cloud 105 can be a private cloud, a public cloud or a hybrid cloud as appropriate for the context.

The user compute device 101 includes a desktop client 114 having a core whisper module 116 and core sensor module 118 (e.g., keyboard monitor). The core sensor module 118 can monitor user input (also referred to herein as an "event(s)") made via an input device (e.g., the keyboard 120), which allows the system 100 to understand (determine or identify) the context of the work being performed by the user. This also allows the system 100 to identify which software, programs, and/or applications are being run on the user compute device 101. Such information (also referred to herein as "event data") can be provided from the user compute device 101 to the second-party cloud 105, via an application program interface 124 (API) to monitor the keyboard entries by the user, the context of work performed by the user, and/or identify the software/programs/applications running on the user compute device 101. As interactions occur at the compute device 101, the desktop client 114 can receive event-related information locally (e.g., from the keyboard 120) and/or remotely (e.g., from the third-party cloud 103; from the second party cloud 105).

The second-party cloud 105 can select (either automatically or with manual assistance) a loop (i.e., software application) for the user compute device 101. For example, additional loops can be delivered from the second-party cloud 105 to the user compute device 101, via the API 122, for execution on the user compute device 101. This loop content can be provided from the second-party cloud 105 to the user compute device 101 for use in the core whisper module 116 and/or the core sensor module 118 of the desktop client 114, as well as the third-party whisper module 108 and/or third-party sensor module 112 of the third-party loop processes 106, 110 of the user compute device 101. The memory 130 can include a library of loops generated and/or approved by the second-party (e.g., default loops) that can be accessed by API 126. Each loop process runs as a separate process. In other words, each loop has its own rules and processes for generating a whisper(s). The selection of which loops processes are run at the compute device 101 can enable selective generation of whispers best suited for a particular scenario. In one embodiment, the loops are chosen based on manual selections by a user (e.g. user requests specific loops from a loop library), by the second-party cloud 105 based on pre-defined parameters (e.g., type of device, type of sensors, type of user), or a combination thereof.

In some implementation, the third-party whisper module 108 and/or third party sensor module 112 can interact with the third-party cloud 103 via an API 104 that allows a third-party to define and modify the characteristics of the whisper function controlled by the core whisper module 116. Thus, the whispers generated at the compute device 101 can be based on loops from the second-party cloud 105, from the third-party cloud 103, and/or a combination thereof. The whisper function can be, for example, the displaying or other type(s) of output of information (e.g., via audio/voice output) to the user, where the information is an aggregation or highlighting of alerts or alert information that involve a higher-level of attention or response by the user of the user compute device. These whispers can be interactive and/or non-interactive (i.e., static). Interactive whispers can receive additional input from a user, as well as output updated information for the user. An example of an interactive whisper can be a pop-up window with a list of available appointments times, where a user can scroll through the list and select a desired time to cause an appointment to be reserved for the user at that selected time. An example of a non-interactive whisper can be a text box or image that is displayed for a pre-set duration of time before disappearing from being displayed.

FIG. 1 also illustrates details on the analytics and ergophenomic structure of the system 100. In particular, the user compute device 101 can send to the second-party cloud 105 (e.g., via API 124) information about the whisper function including, for example, a unique identifier of the whisper loop process, time of a display (or output) of whisper information to the user, a unique identifier of the user, and context leading to (or triggering) the whisper information displayed to the user. Subsequently, the second-party cloud 105 can return to the user compute device 101 state information about the whisper function including, for example, show state, suppress state and deactivate state, and can return whisper text override information. This state information allows the second-party cloud 105 to evaluate and implement possible modifications to the whisper function including, for example, deactivation of the whisper, rate limiting of future whispers, A/B testing (e.g., randomized experiments with two variants), etc. In some implementations, the second-party cloud 105 can include an alerting system 128 for real-time alerting of ergophenomic activity. The memory 130, alerting system 128 and API 124 can be operatively coupled to a data streaming service (e.g., Kinesis Steam) for sharing details related to the analytics and ergophenomic activity.

Figure 2:
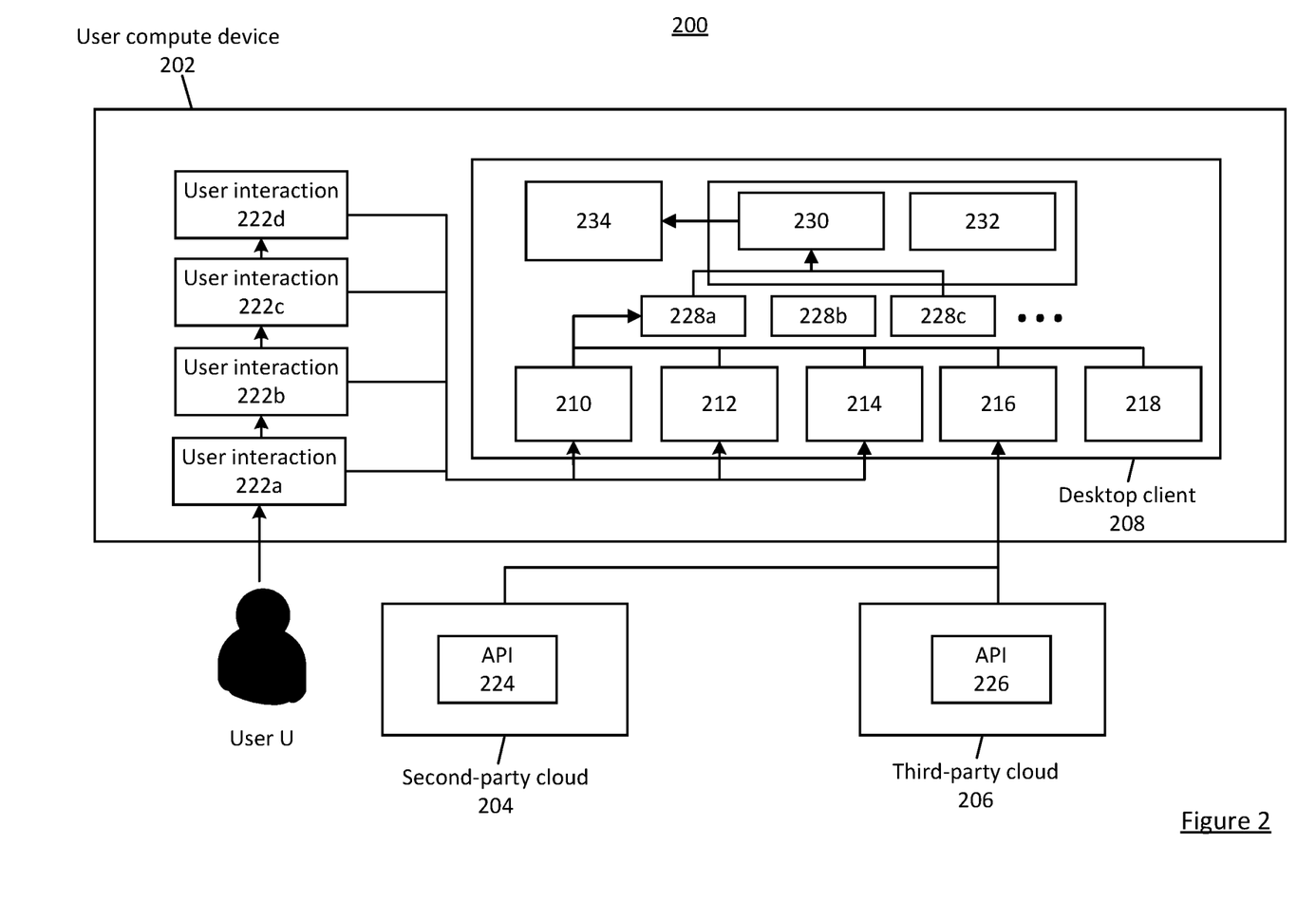
FIG. 2 shows a block diagram of a system for analyzing user interactions to improve workflow, according to an embodiment.

FIG. 2 illustrates another example of a system 200, according to one embodiment. The system 200 includes a user compute device 202, second-party cloud 204, and third-party cloud 206 interconnected via a network (not shown). The user compute device 202 includes a desktop client 208. A user U can interact with the user compute device 202, and these user interactions 222*a*, 222*b*, 222*c*, 222*d* can be monitored and captured. For instance, the keyboard sensor 210 can track how the user U interacts with a keyboard of the user compute device 202, the mouse sensor 212 can track how the user U interacts with a mouse of the user compute device 202, and the application sensor 214 can track how the user U interacts with various applications running in the user compute device 202. Additionally, remote interactions can be captured using the network sensor 216. The network sensor 216 is operatively coupled to the second-party cloud 204 and third-cloud 206 via the network. For instance, if the second-party cloud 204 interacts with the user compute device 202 (e.g. view stream of events, deliver loops, share state information), data can be delivered via API 224. Similarly, if the third-party cloud 206 interacts with the user compute device 202 (e.g., view stream of events, deliver loops, modify loops, share state information), data can be delivered via API 226. Search sensor 218 is another sensor and can be used to search for specific files in a memory of the user computer device 202. As can be appreciated, a sensor herein can refer to a device, module, machine, or subsystem whose purpose is to detect events or changes in its environment, and send the information to other electronics. In other words, sensors can refer to sensors that can be embodied in software and can track physical properties and/or sensors that can track software activity.

In response to the local and/or remote interactions, a stream of events 228*a*, 228*b*, 228*c* can be generated in real-time. The real-time stream of events 228*a*, 228*b*, 228*c* are generated locally in the desktop client 208 (rather than at a remote location) using the sensors 210, 212, 214, 216, 218. From there, the stream of events 228*a*, 228*b*, 228*c* are analyzed by loops 230, 232 in real-time and/or synchronously. If either loop 230, 232 detects a predefined trigger (e.g., predefined event, sequence of events, and/or pattern), loop 230, 232 can generate an associated whisper (also referred to herein as a "message"). For example, loop 232 may have analyzed the stream of events 228*a*, 228*b*, 228*c*, but did not detect anything to cause a whisper to be generated. On the other hand, loop 230 may have analyzed the stream of events 228*a*, 228*b*, 228*c* and upon detecting event 228*a* and event 228*c* (e.g., the user U typed a particular phrase in the keyboard and left-clicked their mouse), an indication can be sent to the whisper module 234 to cause the whisper module 234 to generate a message to the user U, thereby altering the user's U behavior to define a newly optimized user workflow.

Figure 3:
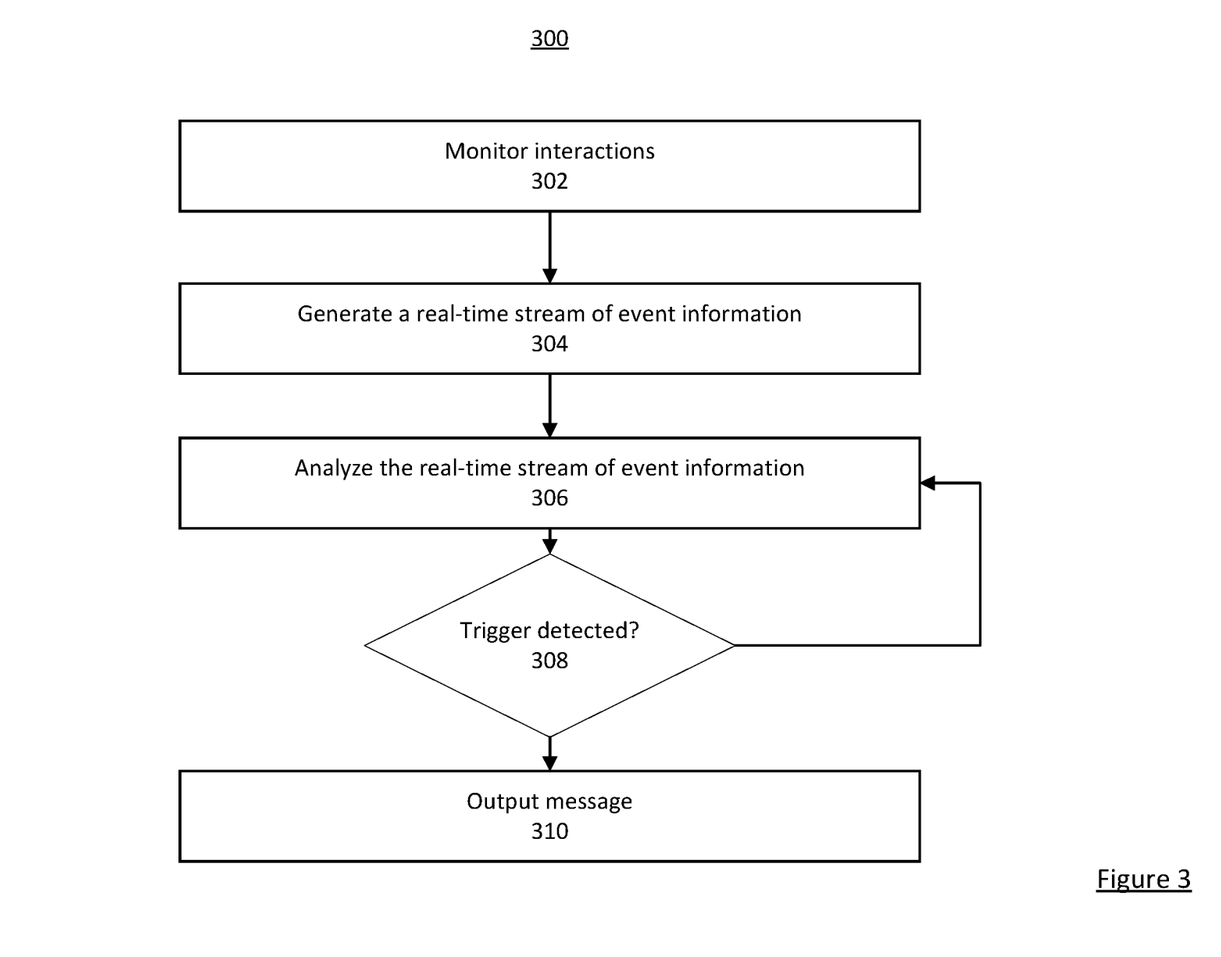
FIG. 3 shows a flowchart of a method for analyzing user interactions to improve workflow, according to an embodiment.

FIG. 3 shows a flowchart of a method 300, according to one embodiment. At 302, interactions (e.g., user interactions 222a, 222b, 222c, 222d) occurring at a user compute device (e.g., user compute device 101, user compute device 202) are monitored. At 304, a real-time stream of event information (e.g., stream of events 228a, 228b, 228c) are generated based on at least a portion of the interactions. At 306, the real-time stream of event information is analyzed using at least one software application (e.g., loops 230, 232). At 308, determination is made as to whether a predefined trigger has been identified by the at least one software application analyzing the real-time stream of event information. If the answer at 308 is yes, at 310, a message (i.e., whisper) is output. If the answer at 308 is no, the processor returns to 306.

Of course, method 300 can have many variations. In some embodiments, the interactions monitored at 302 can include local interactions occurring within a user compute device (e.g., sensors) and/or remote interactions occurring with entities remote to the user compute device (e.g., second-party device such as a second-party cloud 103, 204; third-party device such as a third-party cloud 105, 206).

In some implementations, the at least one software application includes a first software application and a second software application different than the first software application. Thus, at 308, each software application can analyze for different predefined triggers, and if identified, unique messages can be output at 310. The first software application can be received from a first entity, and the second software application can be received from either the first entity or a second entity different than the first entity. For example, the first software application may be received from a second-party cloud (e.g., second-party cloud 105, second-party cloud 204), and the second software application may also be received from the second-party cloud. As another example, the first software application can be received from a second-party cloud, and the second software application can be received from a third-party cloud (e.g., third-part cloud 103, third-party cloud 206). As another example, the first software application can be received from a third-party cloud, and the second software application can be received from the third-party cloud. As another example, a third and/or fourth software application can be received from a second-party cloud and/or a third-party cloud, and the third and/or fourth software application can be modified by the second-party cloud and/or the third-party cloud to generate the first and/or second software application. Of course, it can be appreciated that more than two software applications can be used in other implementations incorporating similar variations.

Users and/or third parties can have the ability to develop these software applications via SDKs. Such SDKs can be provided to allow additional software applications to be available on the software application store. Software development tools that can help to facilitate the creation of these software applications can be bundled together, along with any associated documentation, and made available for download (e.g., from a second-party cloud). In some embodiments, the SDKs can include at least one of: a compiler, a debugger, an API, documentation, a library, runtime/development environments, testing/analysis tools, drivers, and network protocols.

The real-time stream of event information at 304 can be selected from the interactions at 302 based on pre-selected sensors (e.g., sensors 210, 212, 214, 216, 218). These can include sensors to detect local and remote interactions. Examples of interactions and/or events can include keyboard input, clipboard activity, software being accessed, windows being used, text on a screen, mouse activity, camera input, browser usage, search bar input, file system activity, network activity, audio input, audio output, location information, and operating system information.

The message output at 310 can be interactive or non-interactive. If a message is interactive, additional user interactions can be monitored, and based on the user's interactions, the user's compute device can respond accordingly. Further, the message can be audible, visual, or both. For example, the message may be output on a display, and a sound can be played at the time the message is displayed.

The predefined trigger in 308 can vary based on how a particular software application is configured. Examples of predefined triggers can include a specific event, a group of events, or sequence of events, though other predefined triggers can be used.

It should be understood that any references to commercially-available products or services (e.g., Kinesis Stream) are merely examples of such products/services and alternatives that provide the same or similar functionalities are possible. Similarly, although FIGS. 1 and 2 show particular devices and particular arrangements, alternatives are possible. For example, FIG. 1 shows a third-party cloud operatively coupled to the user compute device, but it should be understood that in alternative embodiments the third-party cloud is not present and the functionality provided by the Whisper Support API can be provided from the user compute device and/or the second-party cloud. In yet another example, although the third-party cloud and second-party cloud are shown as cloud systems, it is possible that alternative devices/systems can be provided such as private servers providing the same or similar functionalities.

Although the exchange of whisper analytics and whisper state between the second-party cloud and the core sensor module of the user compute device, it should be understood that the core whisper module (and/or other portions of the desktop client) of the user compute device can be involved as appropriate. For example, when the second-party cloud sends a message to the user compute device to deactivate a whisper function, the message can be provided to core whisper module of the user compute device to trigger deactivation of the identified whisper function.

In some embodiments, a method, comprises: monitoring, by a compute device having interactions with a user and at least one remote entity, the interactions; generating a real-time stream of event information based on at least a portion of the interactions; analyzing, by a first software application operating in the compute device, the real-time stream of event information to identify a first predefined trigger in the real-time stream of event information; analyzing, by a second software application operating in the compute device and different than the first software application, the real-time stream of event information to identify a second predefined trigger in the real-time stream of event information and different from the first predefined trigger; in response to the first predefined trigger, generating a first message event associated with the first predefined trigger; in response to the second predefined trigger, generating a second message associated with the second predefined trigger different than the first message; outputting the first message; and outputting the second message.

In some implementations, the at least one remote entity includes a first remote entity operatively coupled to the compute device and a second remote entity operatively coupled to the compute device different than the first remote entity, further comprising: wirelessly receiving the first software application from the first remote entity; and wirelessly receiving the second software application from the second remote entity.

In some implementations, the at least one remote entity includes a first remote entity operatively coupled to the compute device and a second remote entity operatively coupled to the compute device different than the first remote entity, further comprising: wirelessly receiving the first software application from the first remote entity; and wirelessly receiving a third software application from the first remote entity, the third software application modified based on instructions from the second remote entity to generate the second software application.

Some implementations further comprise: wirelessly receiving the first software application from a remote entity operatively coupled to the compute device; and wirelessly receiving the second software application from the remote entity.

In some implementations, the real-time stream of event information is selected from the interactions of the compute device with the user based on sensor data collected from at least one pre-selected sensor associated with the compute device.

In some implementations, the at least one pre-selected sensor includes at least one of: a keyboard associated with the compute device to track keyboard inputs by the user, or a mouse associated with the compute device to track mouse inputs by the user.

In some implementations, the interactions between the compute device and the user include at least one of keyboard input, clipboard activity, software being accessed, windows being used, text on a screen, mouse activity, browser usage, search bar input, file system activity, network activity, audio input, audio output, location information, or operating system information.

Some implementations further comprise: analyzing, by a third software application operating in the compute device and different than the first software application and the second software application, the real-time stream of event information to identify a third predefined trigger in the real-time stream of event information and different from the first predefined trigger and the second predefined trigger; in response the third predefined trigger, generating a third message associated with the third predefined trigger and different than the first message and the second message; and outputting the third message.

In some embodiments, a non-transitory processor-readable medium stores code representing instructions to be executed by a processor, the instructions comprising code to cause the processor to: generate, by a compute device, a real-time stream of event information based on interactions being monitored at the compute device; analyze, by a first software application operating in the compute device, the real-time stream of event information to identify a first predefined trigger in the real-time stream of event information; analyze, by a second software application operating in the compute device and different than the first software application, the real-time stream of event information to identify a second predefined trigger in the real-time stream of event information and different from the first predefined trigger; in response to the first predefined trigger, generate a first message associated with the first predefined trigger; in response to the second predefined trigger, generate a second message associated with the second predefined trigger different than the first message; output the first message; and output the second message.

In some implementations, the code further comprises code to cause the processor to: receive a third software application from a first remote entity, wherein instructions from a second remote entity different than the first remote entity modified the third software application to generate the first software application.

In some implementations, the first message is interactive and the second message is not interactive.

In some implementations, the interactions include a first portion of interactions from a remote entity operatively coupled to the compute device and a second portion of interactions from sensor data detected from at least one pre-selected sensor associated with the compute device.

In some embodiments, an apparatus comprises: memory storing at least one software application; and a processor operatively coupled to the memory and configured to: monitor interactions with at least one of a user or a remote entity; generate a real-time stream of event information based on at least a portion of the interactions; analyze, by the at least one software application, the real-time stream of event information to identify a predefined trigger in the real-time stream of event information; in response to the predefined trigger, generate a message associated with the predefined trigger; and cause output of the message.

In some implementations, the at least one software application was received from the remote entity, the processor further configured to: send information associated with the output of the message to the remote entity; and receive information associated with a modification of the output of the message from the remote entity.

In some implementations, the information associated with the output of the highlight event includes at least one of: a unique identifier of the at least one software application, a time of the output of the message, a unique identifier associated with the user, the real-time stream of event information when the predefined trigger was identified, or the interactions when the predefined trigger was identified.

In some implementations, the modification includes at least one of a command to continue the output of the message or a command to deactivate the output the message.

In some implementations, the output of the message is audible.

In some implementations, the output of the message is visual.

In some implementations, the output of the message is interactive.

In some implementations, the predefined trigger is at least one of a predefined event included in the real-time stream of event information or a predefined pattern of events included in the real-time stream of event information.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the scope of the disclosure.

The invention claimed is:

1. A method, comprising:
monitoring, by a compute device having interactions with a user and at least one remote entity, the interactions;
generating a real-time stream of event information based on at least a portion of the interactions;
analyzing, by a first software application operating in the compute device, the real-time stream of event information to identify a first predefined trigger in the real-time stream of event information;
analyzing, by a second software application operating in the compute device and different than the first software application, the real-time stream of event information to identify a second predefined trigger in the real-time stream of event information and different from the first predefined trigger;
in response to the first predefined trigger, generating a first message event associated with the first predefined trigger;
in response to the second predefined trigger, generating a second message associated with the second predefined trigger different than the first message;
outputting the first message;
outputting the second message;
analyzing, by a third software application operating in the compute device and different than the first software application and the second software application, the real-time stream of event information to identify a third predefined trigger in the real-time stream of event information and different from the first predefined trigger and the second predefined trigger;
in response the third predefined trigger, generating a third message associated with the third predefined trigger and different than the first message and the second message; and
outputting the third message.

2. The method of claim 1, wherein the at least one remote entity includes a first remote entity operatively coupled to the compute device and a second remote entity operatively coupled to the compute device different than the first remote entity, further comprising:
 wirelessly receiving the first software application from the first remote entity; and
 wirelessly receiving the second software application from the second remote entity.

3. The method of claim 1, wherein the at least one remote entity includes a first remote entity operatively coupled to the compute device and a second remote entity operatively coupled to the compute device different than the first remote entity, further comprising:
 wirelessly receiving the first software application from the first remote entity; and
 wirelessly receiving the third software application from the first remote entity, the third software application modified based on instructions from the second remote entity to generate the second software application.

4. The method of claim 1, further comprising:
 wirelessly receiving the first software application from a remote entity operatively coupled to the compute device; and
 wirelessly receiving the second software application from the remote entity.

5. The method of claim 1, wherein the real-time stream of event information is selected from the interactions of the compute device with the user based on sensor data collected from at least one pre-selected sensor associated with the compute device.

6. The method of claim 5, wherein the at least one pre-selected sensor includes at least one of: a keyboard associated with the compute device to track keyboard inputs by the user, or a mouse associated with the compute device to track mouse inputs by the user.

7. The method of claim 1, wherein the interactions between the compute device and the user include at least one of keyboard input, clipboard activity, software being accessed, windows being used, text on a screen, mouse activity, browser usage, search bar input, file system activity, network activity, audio input, audio output, location information, or operating system information.

8. A non-transitory processor-readable medium storing code representing instructions to be executed by a processor, the instructions comprising code to cause the processor to:
 generate, by a compute device, a real-time stream of event information based on interactions being monitored at the compute device;
 analyze, by a first software application operating in the compute device, the real-time stream of event information to identify a first predefined trigger in the real-time stream of event information;
 analyze, by a second software application operating in the compute device and different than the first software application, the real-time stream of event information to identify a second predefined trigger in the real-time stream of event information and different from the first predefined trigger;
 in response to the first predefined trigger, generate a first message associated with the first predefined trigger;
 in response to the second predefined trigger, generate a second message associated with the second predefined trigger different than the first message;
 output the first message;
 output the second message;
 analyze, by a third software application operating in the compute device and different than the first software application and the second software application, the real-time stream of event information to identify a third predefined trigger in the real-time stream of event information and different from the first predefined trigger and the second predefined trigger;
 in response the third predefined trigger, generate a third message associated with the third predefined trigger and different than the first message and the second message; and
 output the third message.

9. The non-transitory processor-readable medium of claim 8, the code further comprising code to cause the processor to: receive the third software application from a first remote entity, wherein instructions from a second remote entity different than the first remote entity modified the third software application to generate the first software application.

10. The non-transitory processor-readable medium of claim 8, wherein the first message is interactive and the second message is not interactive.

11. The non-transitory processor-readable medium of claim 8, wherein the interactions include a first portion of interactions from a remote entity operatively coupled to the compute device and a second portion of interactions from sensor data detected from at least one pre-selected sensor associated with the compute device.

12. An apparatus, comprising:
 memory storing a first software application, a second software application, and a third software application; and
 a processor operatively coupled to the memory and configured to:
  monitor interactions with at least one of a user or a remote entity;
  generate a real-time stream of event information based on at least a portion of the interactions;
  analyze, by the first software application, the real-time stream of event information to identify a first predefined trigger in the real-time stream of event information;
  analyze, by the second software application, the real-time stream of event information to identify a second predefined trigger in the real-time stream of event information and different than the first predefined trigger;
  analyze, by the third software application, the real-time stream of event information to identify a third predefined trigger in the real-time stream of event information and different than the third predefined trigger;
  in response to at least one of the first predefined trigger, the second predefined trigger, or the third predefined trigger, generate a message; and
  cause output of the message.

13. The apparatus of claim 12, wherein at least one of the first software application, the second software application, or the third software application was received from the remote entity, the processor further configured to:
 send information associated with the output of the message to the remote entity; and
 receive information associated with a modification of the output of the message from the remote entity.

14. The apparatus of claim 13, wherein the information associated with the output of the message includes at least one of: a unique identifier of at least one of the first software application, the second software application, or the third software application, a time of the output of the message, a unique identifier associated with the user, the real-time stream of event information when the first predefined trigger was identified, or the interactions when the first predefined trigger was identified.

15. The apparatus of claim 13, wherein the modification includes at least one of a command to continue the output of the message or a command to deactivate the output the message.

16. The apparatus of claim 12, wherein the output of the message is audible.

17. The apparatus of claim 12, wherein the output of the message is visual.

18. The apparatus of claim 12, wherein the output of the message is interactive.

19. The apparatus of claim 12, wherein the first predefined trigger is at least one of a predefined event included in the real-time stream of event information or a predefined pattern of events included in the real-time stream of event information.

\* \* \* \* \*